(12) United States Patent
Daga

(10) Patent No.: US 11,791,084 B2
(45) Date of Patent: Oct. 17, 2023

(54) AIR COOLED SUBSURFACE VAULT FOR WIRELESS POWER TRANSFER SYSTEMS

(71) Applicant: InductEV, Inc., Malvern, PA (US)

(72) Inventor: Andrew W. Daga, Malvern, PA (US)

(73) Assignee: InductEV, Inc., Malvern, PA (US)

( * ) Notice: Subject to any disclaimer, the term of this patent is extended or adjusted under 35 U.S.C. 154(b) by 0 days.

(21) Appl. No.: 18/081,590

(22) Filed: Dec. 14, 2022

(65) Prior Publication Data

US 2023/0187111 A1    Jun. 15, 2023

Related U.S. Application Data

(60) Provisional application No. 63/265,380, filed on Dec. 14, 2021.

(51) Int. Cl.
| | |
|---|---|
| *H01F 27/08* | (2006.01) |
| *H02J 50/10* | (2016.01) |
| *H01F 27/02* | (2006.01) |
| *B60L 53/12* | (2019.01) |

(52) U.S. Cl.
CPC ............ *H01F 27/085* (2013.01); *B60L 53/12* (2019.02); *H01F 27/025* (2013.01); *H02J 50/10* (2016.02)

(58) Field of Classification Search
CPC ...... H01F 27/085; H01F 27/025; B60L 53/12; H02J 50/10
See application file for complete search history.

(56) References Cited

U.S. PATENT DOCUMENTS

| | | | | | |
|---|---|---|---|---|---|
| 3,271,710 | A | * | 9/1966 | Leonard | H01F 27/085 165/47 |
| 3,404,617 | A | * | 10/1968 | Le Vee | H01F 27/085 165/47 |
| 6,185,099 | B1 | * | 2/2001 | Le Gal | H02J 50/90 257/714 |

(Continued)

FOREIGN PATENT DOCUMENTS

| | | |
|---|---|---|
| CN | 103219775 A | 7/2013 |
| GB | 2577568 A | 4/2020 |

OTHER PUBLICATIONS

International Search Report and Written Opinion for International Application No. PCT/US22/52901 dated May 2, 2023, 6 pages long.

*Primary Examiner* — Jared Fureman
*Assistant Examiner* — Michael J Warmflash
(74) *Attorney, Agent, or Firm* — Volpe Koenig

(57) ABSTRACT

An air-cooled subsurface vault houses a wireless power transfer charger for charging electric vehicles. The vault includes a cavity that receives the wireless power transfer charger and includes an air space around the wireless power transfer charger. At least two grates are positioned on respective sides of the wireless power transfer charger to enable bi-directional air-flow between the surface and the air space around the wireless power transfer charger. A temperature control element is further provided to regulate a temperature within the cavity and the at least two grates. The temperature control element may further include a heat exchanger positioned within the air space of the vault. Each grate is further adapted to act as an inlet or an outlet for the heat exchanger. A controller may be used to control operation of the heat exchanger to control venting duration and a direction of air flow in the cavity.

18 Claims, 8 Drawing Sheets

(56) References Cited

U.S. PATENT DOCUMENTS

| | | | |
|---|---|---|---|
| 2013/0112519 A1* | 5/2013 | Anders | B60L 5/005 |
| | | | 191/10 |
| 2016/0381829 A1* | 12/2016 | Niizuma | B60L 53/122 |
| | | | 361/699 |
| 2017/0001527 A1 | 1/2017 | Prokhorov | |
| 2017/0338023 A1* | 11/2017 | Ansari | H01F 27/085 |
| 2018/0312071 A1* | 11/2018 | Long | B60L 53/39 |
| 2020/0127506 A1* | 4/2020 | McMahon | B60L 53/122 |
| 2020/0139829 A1* | 5/2020 | Laemmle | H02J 50/005 |
| 2022/0104404 A1* | 3/2022 | Feldhaus | B60L 53/302 |
| 2023/0142515 A1* | 5/2023 | Niizuma | F25B 30/02 |
| | | | 701/22 |

* cited by examiner

AIR COOLED SUBSURFACE VAULT FOR WIRELESS POWER TRANSFER SYSTEMS

CROSS-REFERENCE TO RELATED APPLICATION

The present application claims priority to U.S. Provisional Patent Application Ser. No. 63/265,380, filed Dec. 14, 2021. The contents of that application are hereby incorporated by reference.

TECHNICAL FIELD

The present disclosure relates generally to a charging system for wireless power transfer, and more specifically, to devices, systems, and methods related to housing and cooling for a ground-based charging system for wireless power transfer.

BACKGROUND

Generation of heat as a by-product of electrical charging systems for electric vehicles (EVs) is inescapable, with no electrical system being 100% efficient. Wired charging systems for EVs use liquid coolant, interconnecting charging kiosks with fluid handling, electrically driving pumps, and above-ground radiative infrastructure to transfer and disperse heat.

Low power Wireless Power Transfer (WPT) systems (as defined in SAE J2954-1) have largely avoided heating issues by limiting use of WPT to non-flush mounted, low-power charging equipment. SAE J2954-1 specified three low-power levels: WPT1 (3.7 kW), WPT2 (7 kW), and WPT3 (11 kW). Cooling arrangements are not specified within the standard.

High Power Wireless Power Systems have used liquid cooling of the ground-mounted primary assemblies with the same large footprint and density constraints on installation as high-power wired systems despite having no operational need for above-pavement infrastructure for vehicle charging.

SUMMARY

Various examples are now described to introduce a selection of concepts in a simplified form that are further described below in the Detailed Description. The Summary is not intended to be used to limit the scope of the claimed subject matter.

An air-cooled subsurface vault houses a wireless power transfer charger for charging electric vehicles. The vault includes a cavity that receives the wireless power transfer charger and includes an air space around the wireless power transfer charger. At least two grates are positioned on respective sides of the wireless power transfer charger to enable bi-directional air-flow between the surface and the air space around the wireless power transfer charger. A temperature control element is further provided to regulate a temperature within the cavity and the at least two grates. The temperature control element may further include a heat exchanger positioned within the air space of the vault. Each grate is further adapted to act as an inlet or an outlet for the heat exchanger. A controller may be used to control operation of the heat exchanger to control venting duration and a direction of air flow in the cavity.

In sample configurations, the controller adjusts at least one of the venting duration or direction of air flow in the cavity in response to at least one of detection of a charging operation, detection of a temperature of the wireless power transfer charger above a temperature threshold, passage of a predetermined period of time, detection of an exhaust vent back pressure, or detection of blockage of at least one of the at least two grates. A detector may be used to provide an input to the controller indicating whether a vehicle is covering at least one of the grates. In such case, the controller adjusts at least one of the venting duration and direction of air flow in the cavity based on whether at least one of the grates is covered by the vehicle.

In other alternative configurations, the temperature control element includes a fan-driven cooling unit, at least one secondary heat exchanger, and at least one pipe adapted to remove heat from the cavity to the at least one secondary heat exchanger. The at least one secondary heat exchanger may be affixed to or within at least one of the at least two grates. The temperature control element may further include at least one secondary heat exchanger and at least one pipe pressurized by the heat exchanger and adapted to remove heat from the cavity to the at least one secondary heat exchanger. The at least one secondary heat exchanger also may be affixed to or within at least one of the at least two grates.

In yet other alternative configurations, the temperature control element further includes a heating element, at least one secondary heat exchanger, and at least one pipe containing coolant, the heating element producing heat that heats the coolant within the at least one pipe, the coolant circulating to the at least one secondary heat exchanger. The at least one secondary heat exchanger also may be affixed to or within at least one of the at least two grates.

In still other alternative configurations, the temperature control element includes a heating element that produces heated coolant that is circulated to the heat exchange unit. The heat exchange unit produces hot air that is alternately circulated so that respect grates of the at least two grates can act, at alternate times, as air outlets.

In yet further alternative configurations, the temperature control element includes an inverter, an electrical line, and a coil affixed to at least one grate. The electrical line may be extended from the inverter to the coil to induce eddy currents in the at least one grate. Also, the at least one grate may be made of cast iron or an iron alloy. At least one capacitor may be added to the at least one cast iron grate to cause the at least one cast iron grate to resonate. Alternatively, at least one infrared light source may be located within the cavity beneath the at least two grates to illuminate and warm at least one of the at least two grates.

Further configurations may include at least one temperature detector where the controller receives temperature readings from the at least one temperature detector and implements a preset model for at least one of a local environment of the vault, time of day, or season to control operation of the heat exchanger to control the venting duration and the direction of air flow in the cavity.

In still further configurations, a venting direction between the at least two grates may be reversed when a vehicle is positioned over one of the at least two grates to heat the vehicle or to cool the vehicle.

It will be appreciated that the vaults described herein may stand along or may be disposed in a charging depot including a plurality of traffic lanes and a plurality of wireless power transfer chargers.

This summary section is provided to introduce aspects of the inventive subject matter in a simplified form, with further explanation of the inventive subject matter following in the text of the detailed description. The particular combination and order of elements listed in this summary section is not intended to provide limitation to the elements of the claimed subject matter. Rather, it will be understood that this section provides summarized examples of some of the embodiments described in the Detailed Description below.

BRIEF DESCRIPTION OF THE DRAWINGS

The foregoing and other beneficial features and advantages of the invention will become apparent from the following detailed description in connection with the attached figures, of which.

DETAILED DESCRIPTION

A detailed description of illustrative embodiments will now be described with reference to FIGS. 1-10. Although this description provides a detailed description of possible implementations, it should be noted that these details are intended to be exemplary and in no way delimit the scope of the inventive subject matter.

Note that the term "battery" is used herein to depict a generic chemical energy storage system and could be replaced, supplemented, or hybridized with other portable energy storage systems (e.g., solid-state batteries, reversable fuel cells, ultra-capacitors, etc.). Also, while many of the examples used are of a wireless power transfer (WPT) system used to power the onboard systems and charge the batteries of a stationary electric vehicle (EV), this use is by no means the only use contemplated.

Since the wireless power transfer system is modular and can have bi-directional charging ability, the term Ground Transceiver Station (GTS) is used to refer to a grouping of Ground Transceiver Assemblies (GTAs) and Vehicle Transceiver Station (VTS) is used to refer to a grouping of Vehicle Transfer Assemblies (VTAs). A GTS can consist of one-or-more GTAs and a VTS can consist of one-of-more VTAs. For maximum power transfer capability, every VTA in a VTS must be paired and aligned with a corresponding GTA in the GTS.

In an open-air transformer, such as used in magnetic wireless power transfer systems, generated heat comes primarily from resistive losses in the transformer winding wire (due to the primary and secondary currents) and ferrite core loss due to magnetic hysteresis and eddy currents. This results in a need for cooling.

One benefit of a WPT system is the lack of need for charging stands or kiosks since no attachment points interconnection with the EV and kiosk is necessary for electrical power cords, communications, or cooling hose(s). Another advantage is the automatic nature of charging where all vehicle and billing information is exchanged wirelessly over-the-air removing the need for the vehicle driver (or occupant in the case of full autonomous electric vehicles) to exit the vehicle in in unsafe areas or in inclement weather.

By placing all components underground, a minimal footprint can be achieved, resulting in a more unobtrusive and aesthetic installation. The underground system is also more theft and vandalism resistant.

FIG. 1

Figure 1:
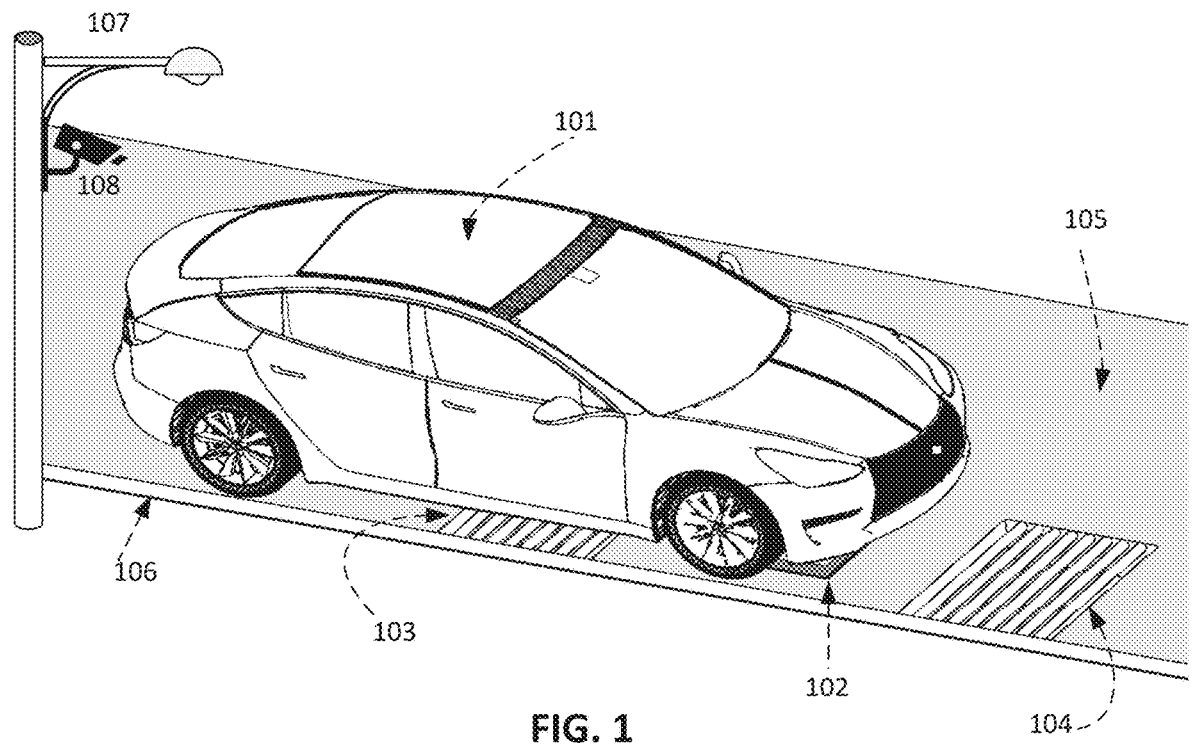
FIG. 1 illustrates an electric vehicle (EV) parked for wireless charging above a ground transceiver station (GTS) including one-or-more ground transceiver assemblies (GTAs).

In FIG. 1, an electric vehicle (EV) 101 is parked for wireless charging above a ground transceiver station (GTS) 102. In FIG. 1, EV 101 is shown while being charged wirelessly. The EV 101 has been positioned so that the GTS 102 is aligned with the EV-mounted Vehicle Transceiver Station (VTS) (not shown). The GTS 102 includes one-or-more ground transceiver assemblies (GTA).

A first grate 103 acts as inlet to the GTS air-cooling system while a second grate 104 acts as exhaust. The EV 101 may be parked or at rest in the charging lane 105. In this illustrative example, the charging lane 105 is delimited on one side by a curb 106.

A lamppost 107 may be disposed adjacent the charging lane. The lamppost 107 may be used to mount a camera 108 arranged to observe the charging lane 105 and may also be used as part of the heat dispersal system in sample configurations.

FIG. 2

Figure 2:
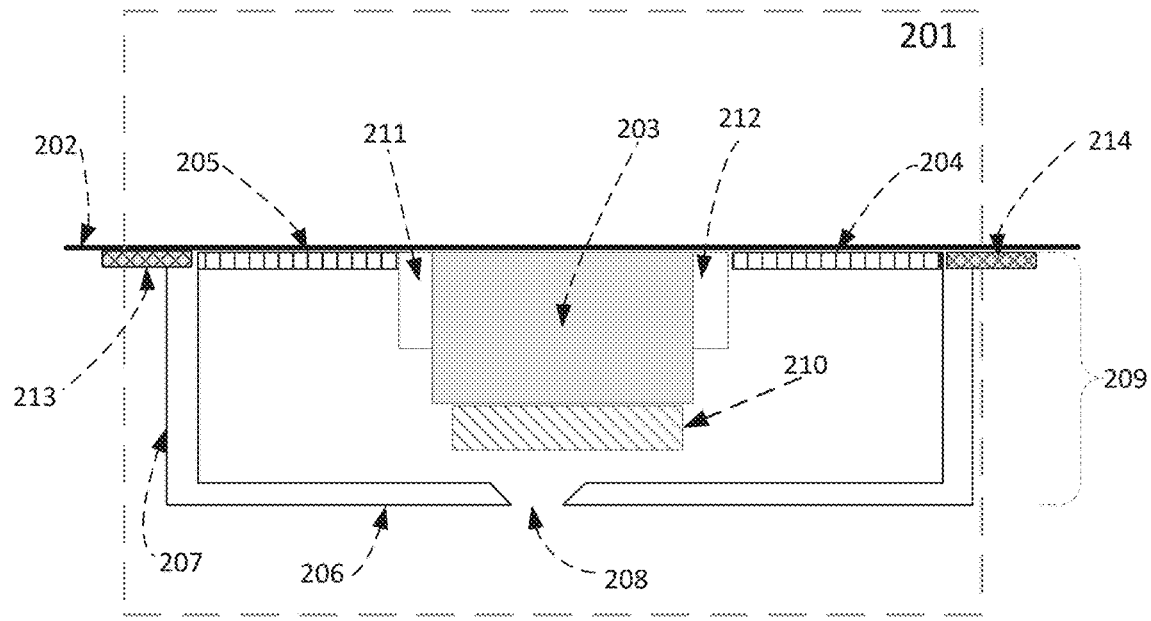
FIG. 2 illustrates a sample configuration of an air-cooled wireless power transfer (WPT) vault in a cut-away, side view.

A sample configuration of a wireless power transfer (WPT) vault is shown in a cut-away, side view in FIG. 2. The vault structure 201 shown in this embodiment is entirely beneath the surface-level of the pavement 202. The ground charger assembly 203 or assemblies (due to the modular design of the coil assembly, there may be one or many coils including one-or-more ground transceiver assemblies (GTA) operating in parallel for WPT) is contained in a weather-proof container. The vault structure 201 is ventilated via two or more surface grates with, at minimum, a first 204 grate and second grate 205.

The vault floor 206 and the vault walls 207 are preferably made from reinforced concrete. Wall thickness will be dictated by the material strength; any relevant city, state, province or national regulations; and the expected maximum vehicle weight (e.g., H-20 standard from the American Association of State Highway Transportation Officials (AASHTO)). The grates 204 and 205 and the container over and around the ground charger assembly 203 must also bear the maximum expected weight.

A sump 208 allows water to be removed from the vault. The total depth of the vault cavity 209 may be limited by building codes but should be at least 0.25 meters to permit air flow over any debris deposited on the vault floor 206. An angled grate (not shown) over the sump 208 prevents clogs and the passing of collected debris beneath the heat exchange unit 210. The vault cavity 209 may also allow human access to the heat exchanger 210 and the ancillary electronics (not shown).

Either of the grates 204 and 205 can act as inlet or exhaust based on the direction of the vent fans (part of the heat exchanger 210). The venting direction and air velocity can be changed as needed to clear dropped or wind deposited debris (e.g., leaves, paper items, plastic waste) from the grates 204 and 205. The effects of the Bernoulli's principle will keep air moving in the airspace beneath the heat exchange.

Changes to the venting velocity can be set to occur prior or during a charging session, when the ground charger assembly 203 internal temperature reaches a threshold, periodically, in response to increased exhaust vent back pressure (as detected by blower motor current draw internal to the heat exchange unit 210), or by blockage detection from an optional external camera(s) (e.g., camera 108 in FIG. 1) mounted to observe the charging vault structure 201.

The vent direction also can be set prior to a WPT charging session allowing the grates 204 and 205 not covered by the vehicle to act as an outlet. The vehicle position may be determined by pavement embedded sensors (e.g., from the weight of vehicle, the magnetic signature of the vehicle, etc.) 213 and 214 or by an overlooking camera 108. This venting selection reduces the heat load on the vehicle as well as using the vehicle chassis to help prevent the ingestion of debris into an inlet with either the first 204 or second 205 grate being selected as the inlet.

Alternatively, the venting direction may be reversed when the EV 101 is positioned over a vent to help heat the EV 101 in cold climes (under direction of the station controller (not shown)) or to cool the EV 101 in hot climes with the exhaust velocity increased.

The vent grates 204 and 205 may be separated from the ground charger assembly (or assemblies) 203 by standoffs 211 and 212. These standoffs 211 and 212 allow convenient positioning of the grates 204 and 205.

FIG. 3

Figure 3:
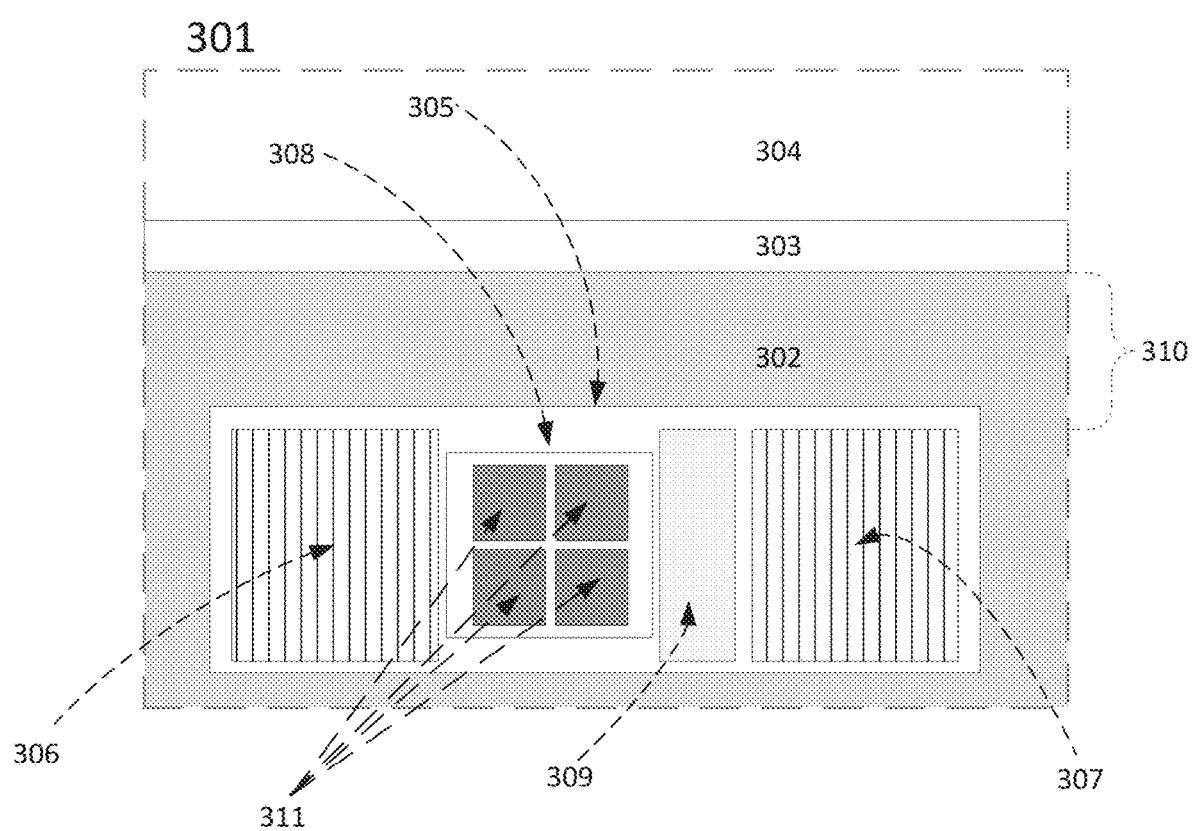
FIG. 3 shows a top view of the vault as installed in a curbside charging station.

FIG. 3 shows a top view of a curbside charging station 301 using an underground cooling vault 305 for housing an inductive wireless power transfer system. The underground cooling vault 305 lies underneath the pavement 302. The pavement 302, in this example, is bordered by a curb 303 which is between the pavement 302 and the sidewalk 304. The underground cooling vault 305 is set a distance 310 from the curb 303 to allow easy positioning of the midline of the EV 101 (not shown) with the mid-line of the Ground Transceiver Station (GTS) 308.

In this example, the GTS 308 has four Ground Transceiver Assemblies (GTAs) 311 for EV charging. The underground cooling vault 305 also has an ancillary electronics coffer 309 for containment of electrical equipment that includes communication bridges and interfaces, a power inverter, and electronics for power factor correction. The coffer 309 is shown here has a separate service cover and is flush-mounted.

The first grate 306 and second grate 307 are cast iron grates set into sockets in the vault cover rendering the entire vault top flush with the pavement 302.

FIG. 4A

Figure 4A:
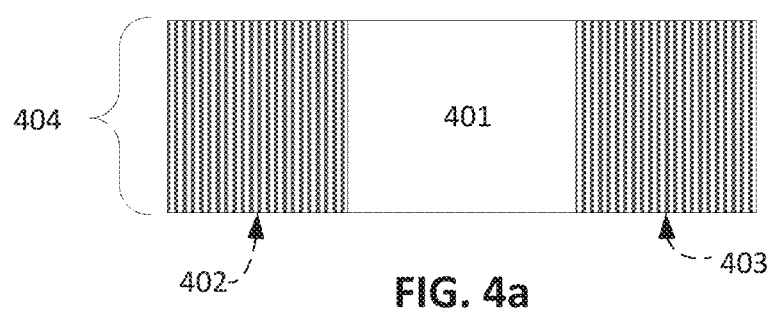
FIG. 4A-4F show different configurations for the air-cooled WPT vault installation with options for vents, plenums, and ducts.

FIG. 4A shows the top view of the simplest vault configuration with the GTS box 401 surrounded on two sides by the first vent grate 402 and second vent grate 403. Note that either the first vent grate 402 or the second vent grate 403 may act either as an inlet or exhaust. This vault is well suited for a) placement in traffic lanes where EV opportunity charging is provided, b) in charging lanes where EVs can be parked curbside, or c) in parking lots spaces such as at a charging station or depot. The width 404 of the GTS box 401 and vent grates 402 and 403 may be narrower than a common EV wheelbase but no wider than a travel lane or parking slot.

FIG. 4B

Figure 4B:
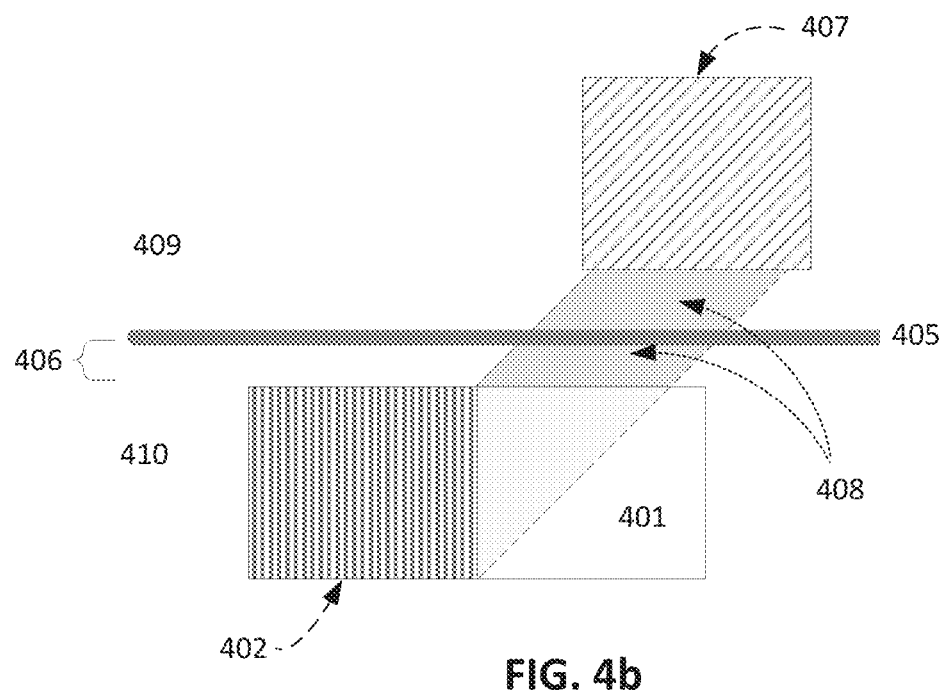

FIG. 4B shows a top view of a vault for curbside placement where minimal space exists in and under the pavement due to pre-existing obstacles to excavation (e.g., tunnels, pipes, communication lines or electrical lines). The GTS box 401 is placed a distance 406 away from the curb 405 in a charging lane 410. A first vent grate 402 is flush with the pavement surface and is next to the GTS box 401 while a second vent grate 407 is embedded in the sidewalk 409 in flush fashion. The second vent grate 407 may be optimized for aesthetics, walkability (e.g., grate sized to prevent catching shoe heels, grate has high friction finish to prevent spills) or to prevent ingress of trash and debris. An additional underground duct 408 attaches the two vent grates 402 and 407 for the passage of air.

FIG. 4C

Figure 4C:
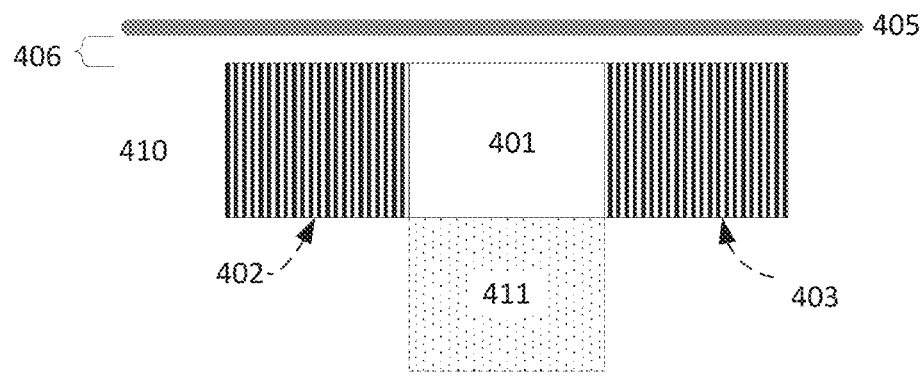

FIG. 4C shows a top view of a curbside vault with an ancillary electronics coffer 411 embedded in the pavement 410 next to a curb 405 and sidewalk 409. A first vent grate 402 and a second vent grate 403 serve as a cooling inlet or exhaust for heat generated by in the GTS box 401 and the ancillary electronics coffer 411. In the FIG. 4C design, the GTS box 401, the vent grates 402 and 403, and the ancillary electronics coffer 411 are all flush with the pavement 410 and situated a distance 406 from the curb 405.

FIG. 4D

Figure 4D:
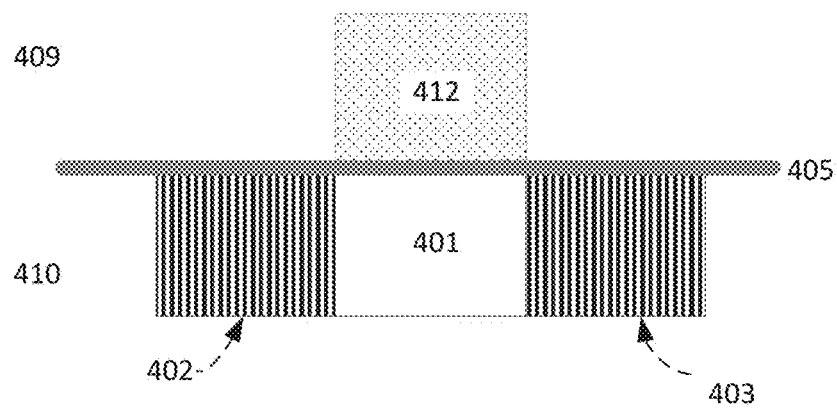

FIG. 4D shows a top view of a vault adjacent a curb 405 with an ancillary electronics coffer 412 embedded in the sidewalk 409. A first vent grate 402 and a second vent grate 403 serve as a cooling inlet or exhaust for heat generated by the GTS box 401 and the ancillary electronics coffer 412. In the FIG. 4D design, the GTS box 401 and the vent grates 402 and 403 are all flush with the pavement 410. The ancillary electronics coffer 412 is flush with the sidewalk 409. The ancillary electronics coffer 412 is air cooled with air ducts extending from the first vent grate 402 and the second vent grate 403 transferred to the heat exchanger (not shown) by liquid coolant, removing the need for additional ducting and fans.

FIG. 4E

Figure 4E:
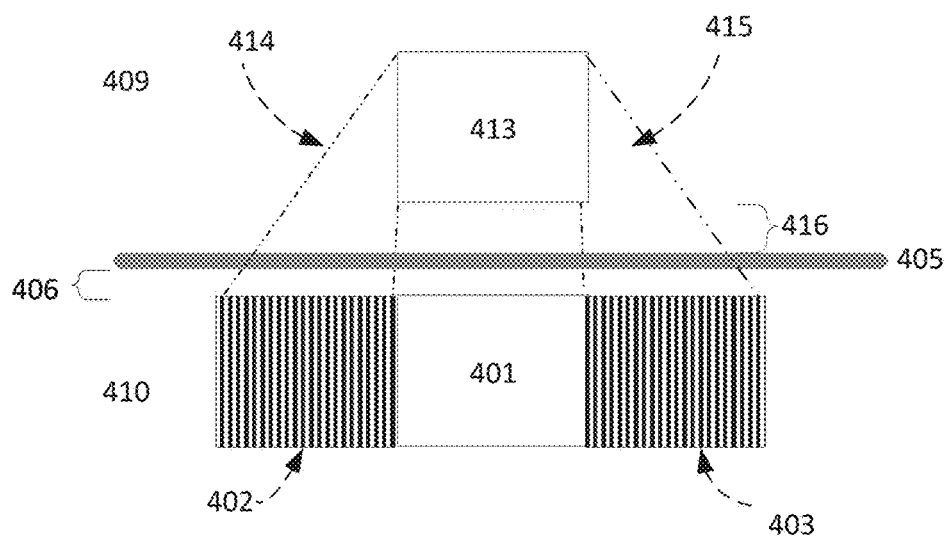

FIG. 4E shows a top view of a vault adjacent a curb 405 with an ancillary electronics coffer 413 embedded in the sidewalk 409. A first vent grate 402 and a second vent grate 403 serve as a cooling inlet or exhaust for heat generated by the GTS box 401 and the ancillary electronics coffer 413. In the FIG. 4E design, the GTS box 401 and the vent grates 402 and 403 are all flush with the pavement 410 and displaced from the curb 405 by a distance 406. The ancillary electronics coffer 413 is flush with the sidewalk 409 and displaced from the curb 405 by a distance 416. The heat generated by electrical devices within the ancillary electronics coffer 413 and the GTS box 401 is moved via liquid coolant to a heat exchanger mounted under the coffer 413. In this design option, the vent grates 402 and 403 and the heat exchanger are positioned to limit the depth under the pavement needed for installation. Excavation is limited to the depth needed by the GTS box 401, which must be embedded in the pavement. The sump and drain (not shown) underly the heat exchanger under the electronics coffer 413.

The air ducts 414 and 415 slant from maximum depth (under the heat exchanger (not shown)) to a minimum depth (in this design the same depth as the GTS box 401) under the vent grates 402 and 403.

FIG. 4F

Figure 4F:
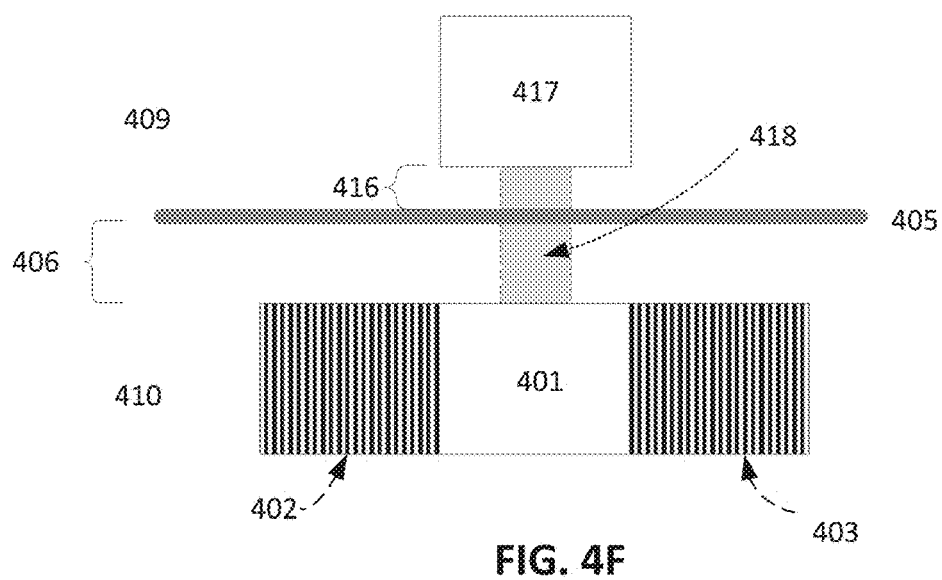

The FIG. 4F vault design has the vault embedded in the pavement 410 with the vent grates 402 and 403 and the GTS box 401 emerging level with the pavement surface at a distance 406 from the curb 405. In this example installation, the ancillary electronics 417 are positioned distance 416 from the curb 405 and flush with the sidewalk 409. The ancillary electronics 417 may be housed in a surface equipment box with conventional passive or active air cooling, independent of the air-cooled vault. The ancillary electronics 417 is connected to the GTS box 401 via a conduit 418 containing the power and communications lines.

FIG. 5A

Figure 5A:
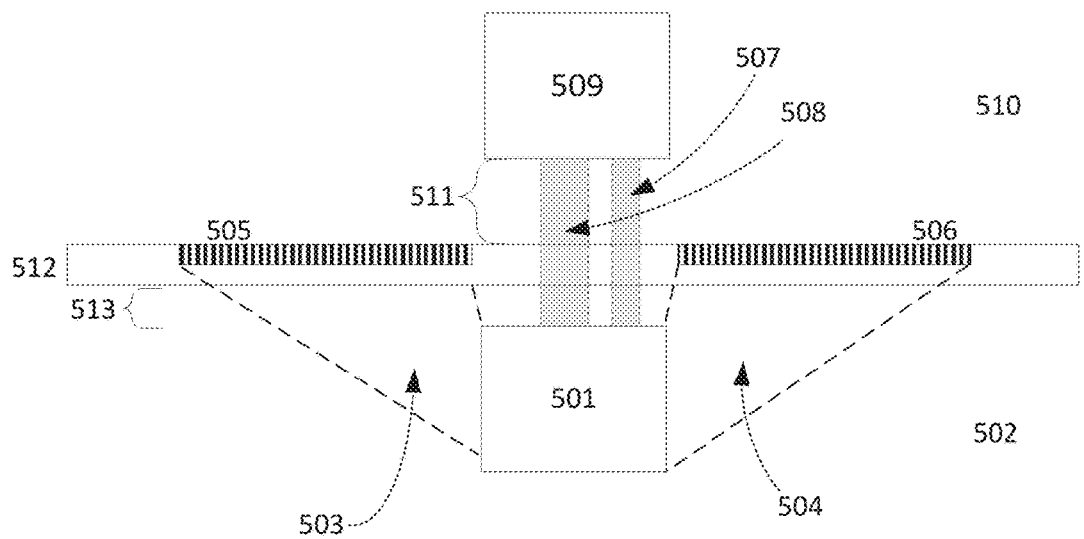
FIG. 5A depicts a top view air-cooled WPT vault with a hollow curb constructed with inset air inlet and outlet ports.

FIG. 5A shows a top view of the WPT vault with curb venting. The GTS 501 is embedded in the pavement 502 with underground ventilation air passages 503 and 504 connecting with the venting curbs 505 and 506 for the movement of cooling air. Electrical lines 507 and liquid coolant pipes 508 connect the GTS 501 and the electronics coffer 509 (shown in this design as embedded in the sidewalk 510). The coffer 509 may be mounted a distance 511 away from the curb 512. Not shown is the heat exchanger mounted under the GTS 501 which serves to cool both the GTS 501 and the electronics in the coffer 509. The GTS 501 is offset a distance 513 from the lane-edge curb 512.

FIG. 5B

Figure 5B:
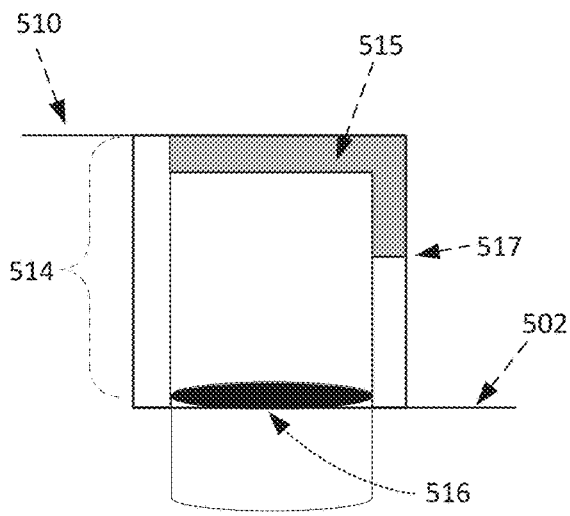
FIG. 5B depicts a side view of a vented hollow curb for WPT air-cooling.

FIG. 5B shows a cut-away side view of an exemplary design for the venting curb 505 and 506 set between the road pavement 502 and a sidewalk 510. The vented curb structure 514 is hollow for its length with a formed metal (e.g., cast iron, steel, aluminum) grate 515 along its length. An interconnect duct 516 connects the vented curb structure 514 to the air ducts 503 and 504 and can be used as an inlet or exhaust for cooling air dependent on the heat exchangers cooling fan(s) direction. The interconnect duct 516 also serves to drain any water that comes over the lip 517 of the curb vent structure 514.

FIG. 5C

Figure 5C:
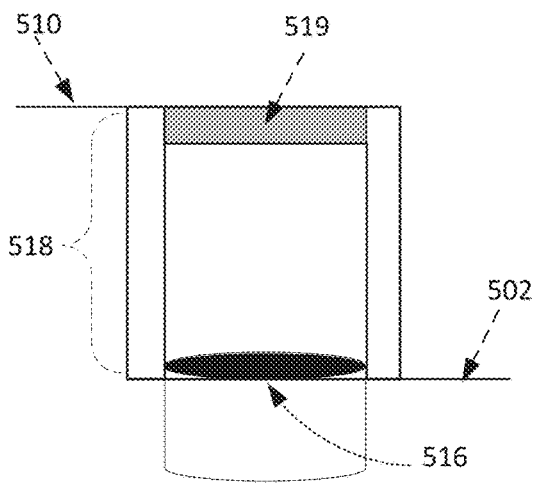
FIG. 5C shows an alternative venting of a hollow curb for WPT air-cooling.

FIG. 5C shows an alternative configuration for the venting curb 505 and 506 using a hollow venting curb structure 518. In this example design shown in cut-away side view, the venting grate 519 is limited to the top of the hollow curb structure 518 to minimize the ingestion of street water runoff into the top vented curb 518 and therefore the interconnect duct 516 to the underground air ducts 503 and 504.

FIG. 6

To mitigate the effect of snow and ice impact on ventilation while the GTS is idle and no wireless charging heating is being generated, an auxiliary heating arrangement is provided.

Figure 6:
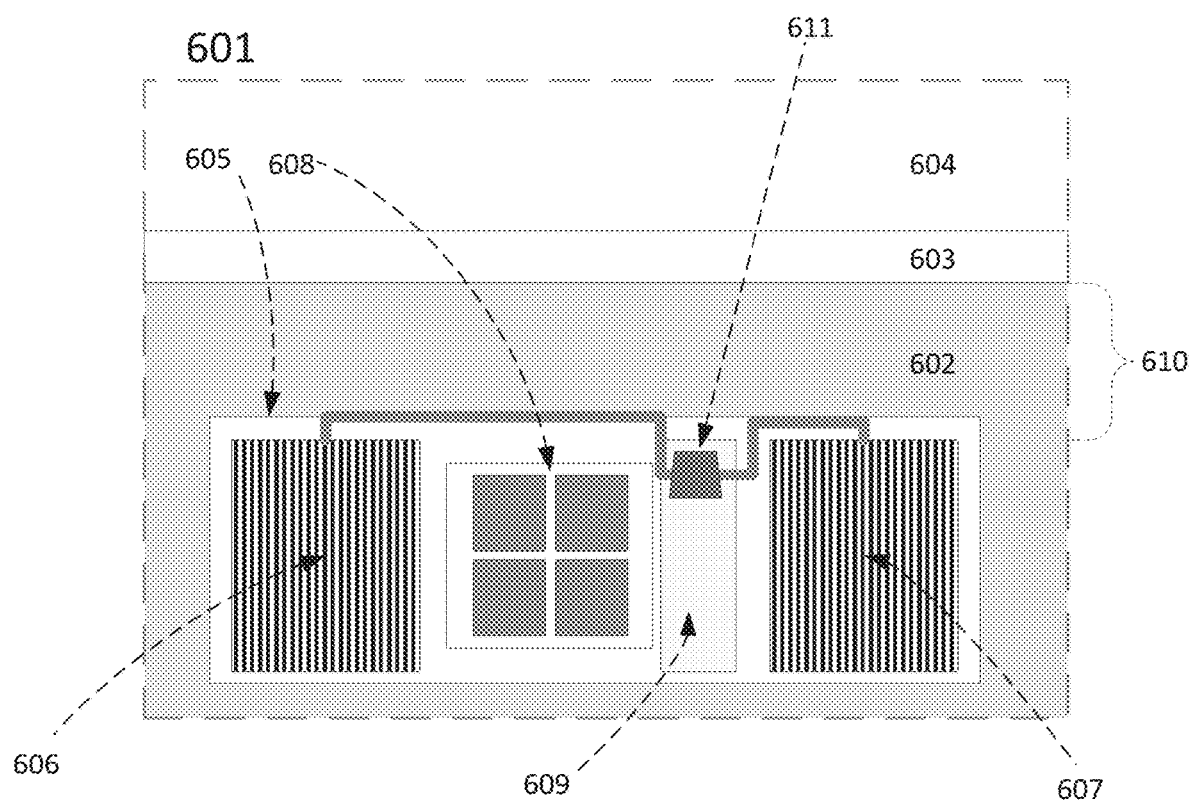
FIG. 6 illustrates a top view of a sample configuration of the WPT vault structure with liquid coolant being used to heat the vent grates.

FIG. 6 illustrates a top view of a sample configuration of an air-cooled charger 601. The road surface 602 is edged by the curb 603. A sidewalk 604 is situated next to the curb 603. The WPT box 605 is embedded in the road surface 602 with the first vent grate 606 and second vent grate 607 vertically flush with the road surface 602. The GTS 608, here shown as a 4 GTA unit, is similarly vertically positioned flush with the road surface 602. An electronics coffer 609, containing the inverter and supporting electronics for communications as well as those to power and control power to the individual GTAs, is housed in the WPT vault in this example. The electronics coffer 609 is thermally isolated from the GTS 608 but both share the heat exchanger (not shown) via liquid coolant piping. In this example, the vault is a curbside installation, separated from the curb 603 by a distance 610 to allow easy positioning of the EV.

In the electronics box 609, auxiliary in-line heating element 611 may be included. This heating element 611 can produce heat when the GTS 608 is not in use for the purpose of heating the coolant which is circulated to the secondary heat exchangers (not shown) affixed to the vent grates 606 and 607. The heat then prevents buildup of ice and snow on the vent grates 606 and 607. In an alternative design, the heating element 611 produces heated coolant which is directed to the primary heat exchanger (not shown) which then supplies coolant to the secondary each exchangers (not shown) affixed to the first vent grate 606 and second vent grate 607.

In another configuration, an in-line heating element 611 housed in the electronics coffer 609 may produce heated coolant that is circulated to the primary heat exchange unit (not shown) so that hot air may be produced when the GTS 608 is quiescent for extended periods of time during cold weather. This hot air is alternately circulated so that both vent grates 606 and 607 act, at alternate times, as outlets and are kept free of snow and ice by the blown, warm air.

Also, the charger 601 may not be operating during ice storms and blizzards which are fairly extraordinary events in the lifetime of a charger in many deployment areas.

Additionally, the GTS 608 itself may need protection from severe cold. The auxiliary heating arrangement 611 can be used to feed the primary heat exchanger (not shown) directly to maintain GTS 608 temperature independently of the status of the vent grates 606 and 607.

In an additional configuration, a high-frequency electrical line is extended from the inverter within the electronics box 609 to a supplemental coil affixed to each vent grate 606 and 607. These coils would be used to induce eddy currents in the cast iron elements of the vent grates 606 and 607 when needed for ice or snow removal. The cast iron vent grates 606 and 607 would keep the magnetic field tightly constrained. Supplemental capacitors could be added to the cast iron vent grates 606 and 607 to cause it to resonate. In the electronics box 609, the inverter would output AC current at a lower frequency than to the GTS 608 during a charging session to reduce stress on the inverter. Use of the supplemental resonant coil heating is expected to need only a few kW of power intermittently as the severe weather continues.

FIG. 7

Figure 7:
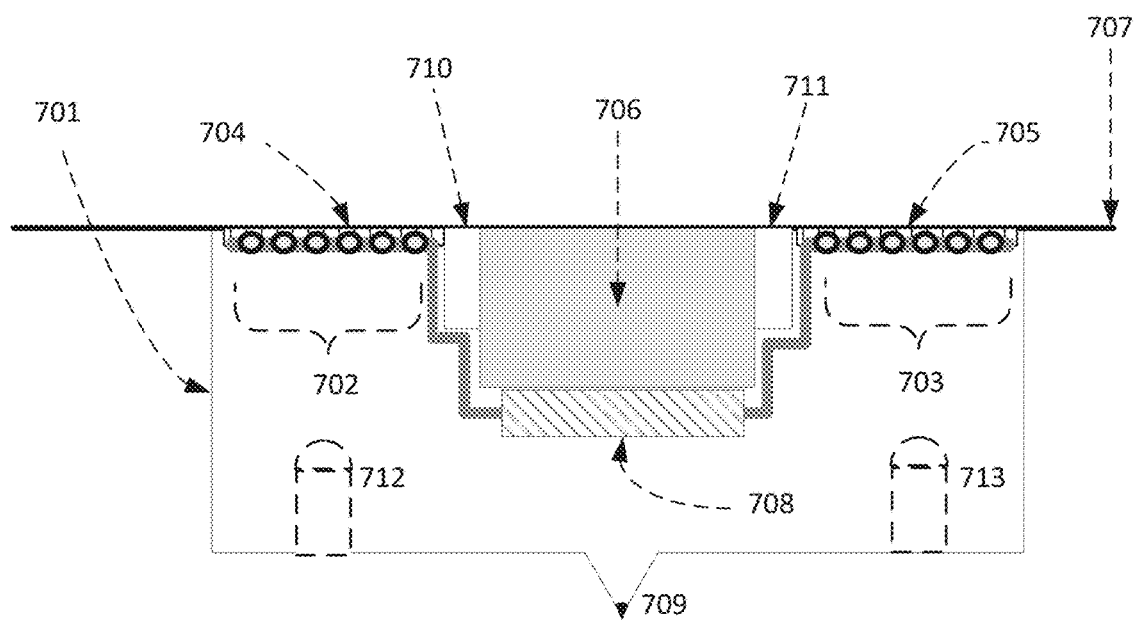
FIG. 7 shows a side view of a sample configuration of the vault structure with liquid coolant being used to heat the vent grates via secondary heat exchangers.

A side view of the air-cooled underground WPT vault 701 with secondary heat exchangers 702 and 703 mounted to the vent grates 704 and 705 is presented in FIG. 7. The GTS box 706, mounted below grade, flush with the pavement surface 707 is cooled by the transfer of liquid coolant to the heat exchanger 708. As the outside temperate falls to near or below freezing, the vent grates 704 and 705 are heated via the secondary heat exchangers 702 and 703 to prevent or remove snow and ice buildup. The melted snow and ice will be removed from the vault 701 via the sump and drain 709. The first vent grate 704 is separated from the GTS box 706 by a first standoff 710 and the second vent grate 705 is separated from the GTS box 706 by a second standoff 711.

In yet another alternative configuration, plenum chambers underneath the vent grates 704 and 705 can be outfitted with first and second non-visible infrared lights 712 and 713 to illuminate, as needed, the vent grates 704 and 705 to keep them warmed.

FIG. 8

Figure 8:
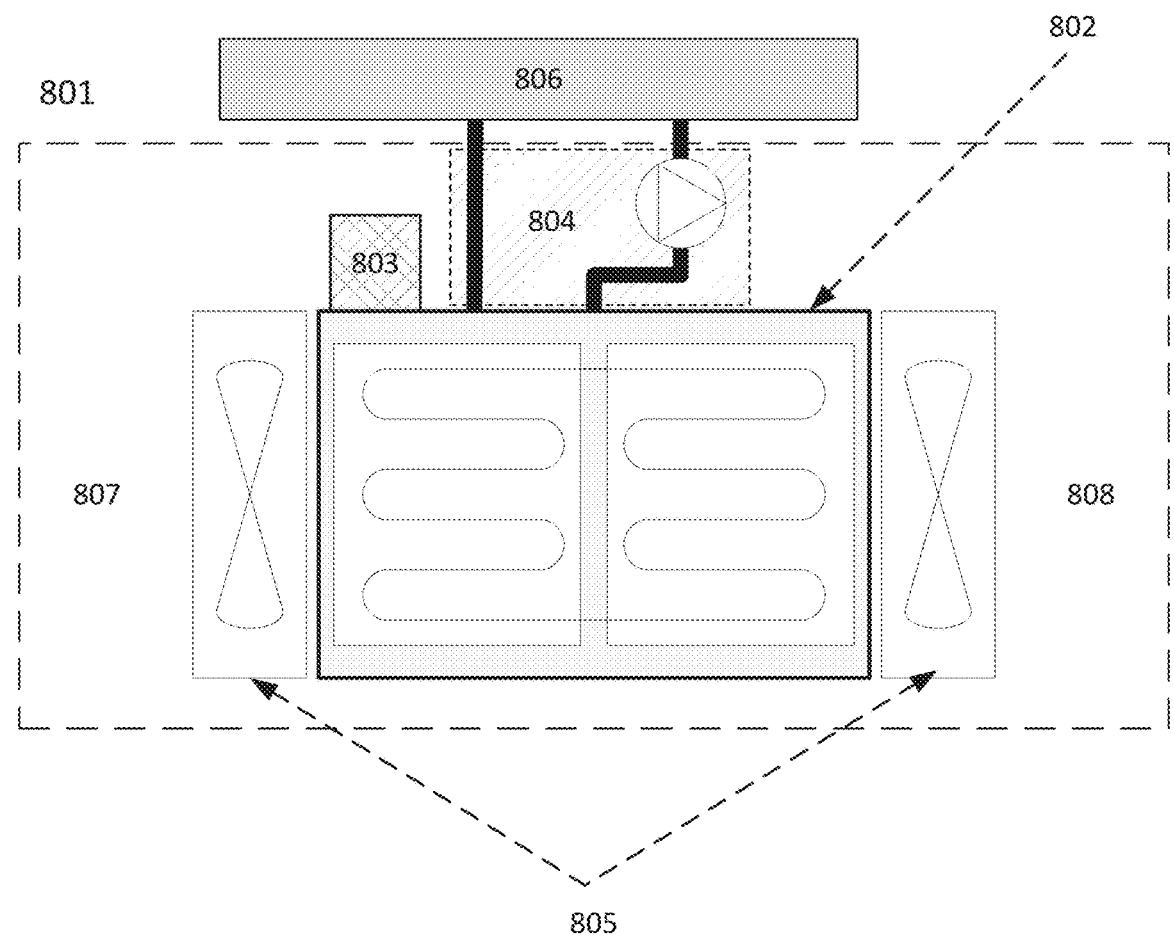
FIG. 8 depicts a subsystem view of the Ground Transceiver Station with thermal control structure and elements.

FIG. 8 illustrates details for a sample configuration of a WPT vault heat exchange unit 801. The heat exchange (HE)

unit 801 includes four major subsystems: the heat exchanger 802, the controller 803, coolant plumbing 804, and airflow generation 805.

The heat exchanger 802 may be a conventional air-cooled, liquid coolant to air exchange. The liquid coolant plumbing 804 includes pumps, valves and branches to control coolant flow to the GTS 806 and any secondary heat exchangers (not shown).

The heat exchange unit 801 is controlled and monitored by the heat exchange controller (HEC) 803 based on sensor inputs and forecasting models. Temperature sensors (not shown) in the GTS 806 as well as located in the coolant plumbing 804 and air plenum chambers 807 and 808 measure air temperature and GTS temperature. The GTS 806 also supplies to the HEC 803 a charging indication which includes the requested power transfer when a charging session is active.

The HEC 803 uses the acquired temperatures and preset models for the local environment, time of day, and season to adjust the cooling airflow generated by the HE airflow generation unit 805. The HEC 803 also uses the heat limitations for the GTS 806 as well as the maximum allowable heated air temperature limit (e.g., 10° C. above ambient) and the inlet and outlet grate temperatures (maximum temperature set by regulation or standards (e.g., ASTM C1055; Guide for Heated System Surface Conditions that Produce Contact Burn Injuries)) to prevent contact burns (nominally 40°-45° C. for metallic surfaces).

The coolant plumbing 804 of the heat exchange unit 801 may include the redundant fans and coolant pumps under control of the HEC 803.

FIG. 9

Figure 9:
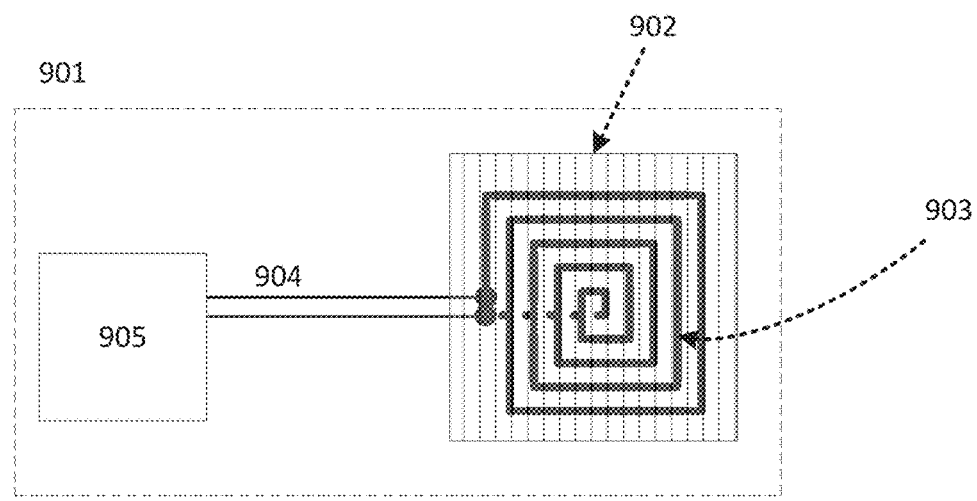
FIG. 9 illustrates an inductive coil for heating of a metal vent grate for snow and ice removal.

In FIG. 9, an inductive heating system for the supplemental control of ice and snow buildup in the ventilation grates of the WPT vault is illustrated. As with the other methods of grate heating described above, the reversable airflow also will be used.

Each vault 901 is designed with two or more ventilation grates 902 which can alternately function as an intake or an exhaust. A single section of the inductively heated intake or exhaust system is shown.

The ventilation grate 902 is constructed of cast iron or iron alloy in a sample configuration. The coil 903, mounted to the underside of the ventilation grate 902, has a resonant frequency between 25 kHz and 50 kHz which couples well with cast iron. Since the wavelength of the resonant frequency and first 10 harmonic frequencies is orders of magnitude less than the largest gap spacing (3-4 meters) of the cast iron grate, the ventilation grate 902 acts as effective magnetic shielding.

The coil 903 is conducted of multiple wire windings. The coil 903 receives the AC power signal via wired (e.g., Litz wire) connections 904 from the AC power supply 905.

Depending on expected local weather severity and grate size, more than one coil 903 can be affixed to a ventilation grate 902. Multiple power supplies 905 can be installed for capacity or redundancy.

FIG. 10

Figure 10:
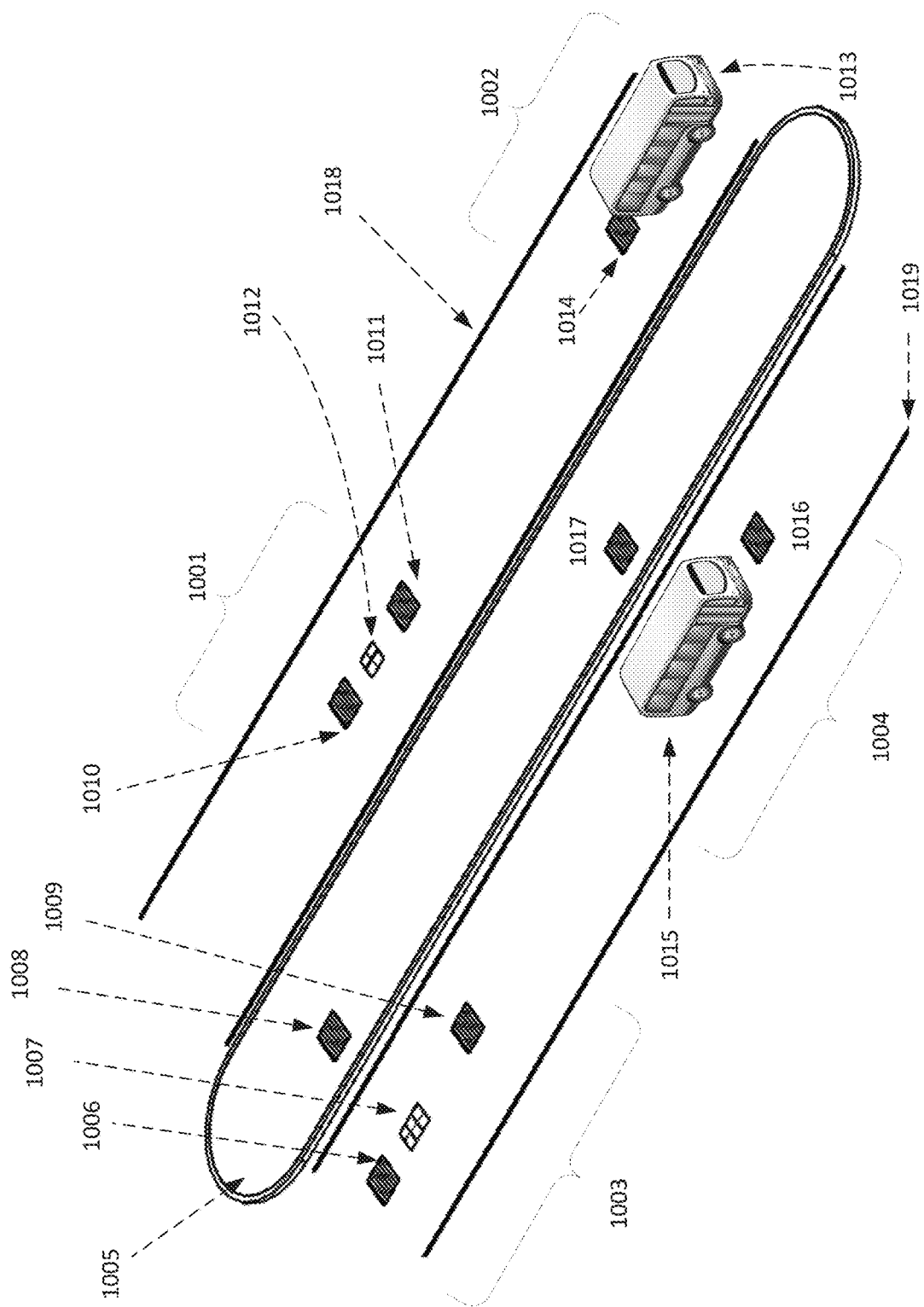
FIG. 10 shows an aerial view of a WPT changing depot for transit EVs using variations of the underground, air-cooled WPT vault.

FIG. 10 shows an aerial view of a charging depot. Several charging positions 1001, 1002, 1003, and 1004 are depicted around a raised island structure 1005. Two different types of charging position, each equipped with a specific underground air-cooled vault with ducting, venting, and plenum structures are shown. A charging depot WPT installation may be customized in power delivery and layout to serve a specific set of vehicle type(s).

The first example charging position, a first type of high-power charging position 1003, has a first venting grate 1006, a modular GTS 1007 with 6 GTAs, an offset second venting grate 1008, and a third venting grate 1009.

The second exemplary type of high-power charging position 1001 has a first venting grate 1010, a second venting grate 1011, and a modular GTS 1012 with 4 GTAs.

A first bus 1013 is shown using a second-type of charging position 1002. The exposed venting grate 1014 is used as the exhaust for the air-cooled GTS vault in this example.

A second bus 1015 is shown using the first-type charging position 1004. The in-lane exposed venting grate 1016 and the island grate 1017 are both used for exhaust for the air-cooled GTS vault.

Lane markers 1018 and 1019 and the raised island 1005 are used to delineate the traffic lanes for charging.

In an alternative configuration, additional passive cooling devices such as heat pipes may also be used by the heat exchanger to move heat to underground cooling reservoirs, or to the surface passive cooling elements such as metal curbs, radiators, or active cooling structures such as secondary heat exchangers hidden within vented bollards or disguised as fluted, vented hollow light posts. A light post 107 (FIG. 1) also may be used for affixing security lighting, video surveillance camera(s) 108, and local-area-wireless-network antenna(s).

CONCLUSION

While various implementations have been described above, it should be understood that they have been presented by way of example only, and not limitation. For example, any of the elements associated with the systems and methods described above may employ any of the desired functionality set forth hereinabove. Thus, the breadth and scope of a preferred implementation should not be limited by any of the above-described sample implementations.

The logic, commands, or instructions that implement aspects of the methods described herein (e.g., heat exchange controller) may be provided in a computing system including any number of form factors for the computing system such as desktop or notebook personal computers, mobile devices such as tablets, netbooks, and smartphones, client terminals and server-hosted machine instances, and the like. Another embodiment discussed herein includes the incorporation of the techniques discussed herein into other forms, including into other forms of programmed logic, hardware configurations, or specialized components or modules, including an apparatus with respective means to perform the functions of such techniques. The respective algorithms used to implement the functions of such techniques may include a sequence of some or all of the electronic operations described herein, or other aspects depicted in the accompanying drawings and detailed description below. Such systems and computer-readable media including instructions for implementing the methods described herein also constitute sample embodiments.

The functions described herein with respect to the controllers may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware, or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server, or other computer system, turning such computer system into a specifically programmed machine.

Examples, as described herein, may include, or may operate on, processors, logic, or a number of components, modules, or mechanisms (herein "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. The software, when executed by the underlying hardware of the module, causes the hardware to perform the specified operations.

Accordingly, the term "module" is understood to encompass a tangible hardware and/or software entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Those skilled in the art will appreciate that while the disclosure contained herein pertains to the provision of electrical power to vehicles, it should be understood that this is only one of many possible applications, and other embodiments including non-vehicular applications are possible. For example, those skilled in the art will appreciate that there are numerous applications where customers wait in queues and it is desired to provide charging to customer electronic devices as the customer moves through the queue. For example, inductive portable consumer electronic device chargers, such as those (e.g., PowerMat™) used to charge toothbrushes, cellular telephones, and other devices may be managed as described herein. Accordingly, these and other such applications are included within the scope of the following claims.

What is claimed:

1. An air-cooled subsurface vault adapted to house a wireless power transfer charger, the air-cooled subsurface vault comprising:
   a cavity that receives the wireless power transfer charger and includes an air space around the wireless power transfer charger;
   at least two grates on respective sides of the wireless power transfer charger and positioned to enable bidirectional airflow between the surface and the air space around the wireless power transfer charger;
   a temperature control element adapted to regulate a temperature within the cavity and at the at least two grates and including a heat exchanger positioned within the air space of the cavity, wherein each grate of the at least two grates is adapted to act as an inlet or an outlet for the heat exchanger;
   a controller adapted to control operation of the heat exchanger to control venting duration and a direction of air flow in the cavity; and
   a detector that provides an input to the controller indicating whether a vehicle is covering at least one of the grates, wherein the controller adjusts at least one of the venting duration and direction of airflow in the cavity based on whether at least one of the grates is covered by the vehicle.

2. The vault of claim 1, wherein the cavity has reinforced concrete floors and walls.

3. The vault of claim 1, further comprising a sump positioned to remove water from the cavity.

4. The vault of claim 1, wherein the controller adjusts at least one of the venting duration or direction of airflow in the cavity in response to at least one of detection of a charging operation, detection of a temperature of the wireless power transfer charger above a temperature threshold, passage of a predetermined period of time, detection of an exhaust vent back pressure, or detection of blockage of at least one of the at least two grates.

5. The vault of claim 1, further comprising standoffs between the wireless power transfer charger and the at least two grates to provide a predetermined distance of separation between the wireless power transfer charger and the at least two grates.

6. The vault of claim 1, wherein the temperature control element further comprises a fan-driven cooling unit, at least one secondary heat exchanger, and at least one pipe adapted to remove heat from the cavity to the at least one secondary heat exchanger.

7. The vault of claim 6, wherein the at least one secondary heat exchanger is affixed to or within at least one of the at least two grates.

8. The vault of claim 1, wherein the temperature control element further comprises at least one secondary heat exchanger and at least one pipe pressurized by the heat exchanger and adapted to remove heat from the cavity to the at least one secondary heat exchanger.

9. The vault of claim 8, wherein at least one secondary heat exchanger is affixed to or within at least one of the at least two grates.

10. The vault of claim 1, wherein the temperature control element further comprises a heating element, at least one secondary heat exchanger, and at least one pipe containing coolant, the heating element producing heat that heats the coolant within the at least one pipe, the coolant circulating to the at least one secondary heat exchanger.

11. The vault of claim 10, wherein the at least one secondary heat exchanger is affixed to or within at least one of the at least two grates.

12. The vault of claim 1, wherein the temperature control element further comprises a heating element that produces heated coolant that is circulated to the heat exchange unit.

13. The vault of claim 12, wherein the heat exchange unit produces hot air that is alternately circulated so that respect grates of the at least two grates can act, at alternate times, as air outlets.

14. The vault of claim 1, further comprising at least one infrared light source located within the cavity beneath the at least two grates to illuminate and warm at least one of the at least two grates.

15. The vault of claim 1, further comprising at least one temperature detector, wherein the controller receives temperature readings from the at least one temperature detector and the controller implements a preset model for at least one of a local environment of the vault, time of day, or season to control operation of the heat exchanger to control the venting duration and the direction of air flow in the cavity.

16. The vault of claim 1, wherein the at least two grates are built into a curb.

17. The vault of claim 1, wherein the venting direction between the at least two grates is reversed when the vehicle is positioned over one of the at least two grates to heat the vehicle or to cool the vehicle.

18. The vault of claim 1, wherein the vault is disposed in a charging depot comprising a plurality of traffic lanes and a plurality of wireless power transfer chargers.

* * * * *